(12) United States Patent
Cham et al.

(10) Patent No.: US 7,653,272 B2
(45) Date of Patent: Jan. 26, 2010

(54) HIGHLY PARALLEL OPTICAL COMMUNICATION SYSTEM WITH INTRACARD AND INTERCARD COMMUNICATIONS

(75) Inventors: Kit M. Cham, Cupertino, CA (US); Lisa A. Buckman, Pacifica, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 1300 days.

(21) Appl. No.: 10/252,145

(22) Filed: Sep. 19, 2002

(65) Prior Publication Data

US 2004/0213503 A1 Oct. 28, 2004

(51) Int. Cl.
*G02B 6/12* (2006.01)
(52) U.S. Cl. .......................................... 385/17; 385/14
(58) Field of Classification Search .................... 385/14, 385/16–19, 47, 130, 131, 8, 88; 398/55, 398/56
See application file for complete search history.

(56) References Cited

U.S. PATENT DOCUMENTS

| | | | |
|---|---|---|---|
| 4,732,446 A * | 3/1988 | Gipson et al. .................. 385/24 |
| 4,746,624 A | 5/1988 | Cham et al. |
| 4,894,694 A | 1/1990 | Cham et al. |
| 4,999,523 A | 3/1991 | Cham et al. |
| 5,093,890 A | 3/1992 | Bregman et al. |
| 5,189,310 A | 2/1993 | Cham et al. |
| 5,255,332 A * | 10/1993 | Welch et al. ................... 385/17 |
| 5,367,584 A * | 11/1994 | Ghezzo et al. ................. 385/17 |
| 5,511,142 A * | 4/1996 | Horie et al. ................... 385/129 |
| 5,952,686 A | 9/1999 | Chou et al. |
| 5,960,132 A * | 9/1999 | Lin ............................... 385/18 |
| 6,114,739 A | 9/2000 | Theil et al. |
| 6,134,013 A | 10/2000 | Sirat et al. |
| 6,198,856 B1 * | 3/2001 | Schroeder et al. ............. 385/17 |
| 6,207,973 B1 | 3/2001 | Sato et al. |
| 6,210,046 B1 | 4/2001 | Rogers et al. |
| 6,215,222 B1 | 4/2001 | Hoen |
| 6,343,171 B1 * | 1/2002 | Yoshimura et al. ............ 385/50 |
| 6,362,556 B1 * | 3/2002 | Hoen ........................... 310/309 |
| 6,366,715 B1 * | 4/2002 | Wang ........................... 385/17 |
| 6,393,184 B1 * | 5/2002 | Day et al. ...................... 385/49 |
| 6,404,942 B1 * | 6/2002 | Edwards et al. ............... 385/18 |
| 6,445,840 B1 * | 9/2002 | Fernandez et al. ............ 385/17 |
| 6,453,083 B1 * | 9/2002 | Husain et al. ................. 385/17 |
| 6,567,573 B1 * | 5/2003 | Domash et al. ............... 385/16 |

OTHER PUBLICATIONS

Chen et al., "Fully Embedded Board-Level Guided-Wave Optoelectronic Interconnects", Proceedings of the IEEE, vol. 88, No. 6, Jun. 2000, pp. 780-793.

* cited by examiner

*Primary Examiner*—Peter Macchiarolo

(57) ABSTRACT

An optical communications system including a method and apparatus with an electro-optical chip which includes optical interface elements in optical interface array configuration on a first side of the electro-optical chip, attached to or integrated with an optical circuit board which includes a plurality of layered optical wave guides, a plurality of coupling elements disposed relative to the electro-optical chip such that the plurality of coupling elements optically communicate with the first plurality of optical interface elements on the electro-optical chip, and wherein the coupling elements are further disposed to optically communicate with the plurality of optical wave guides.

20 Claims, 3 Drawing Sheets

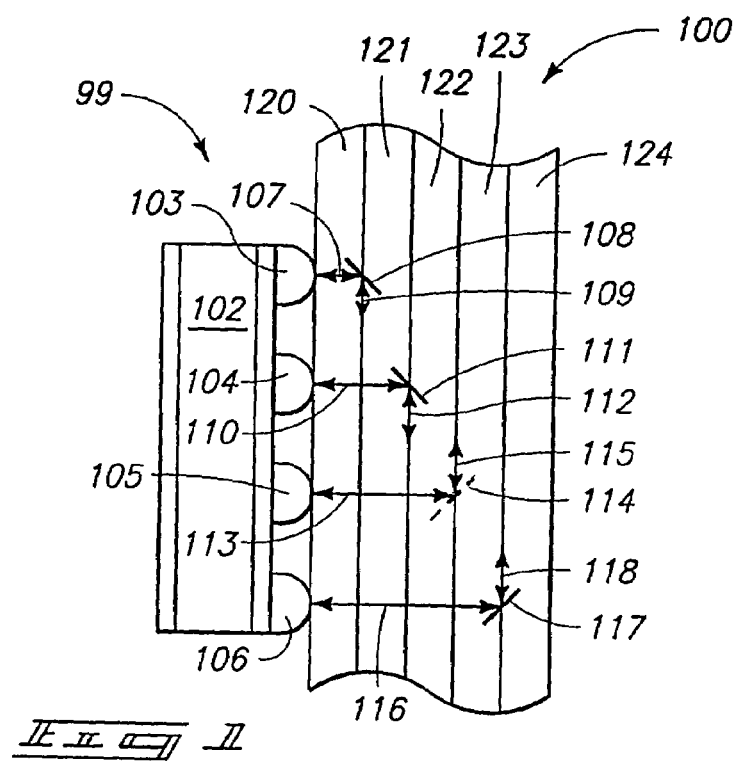
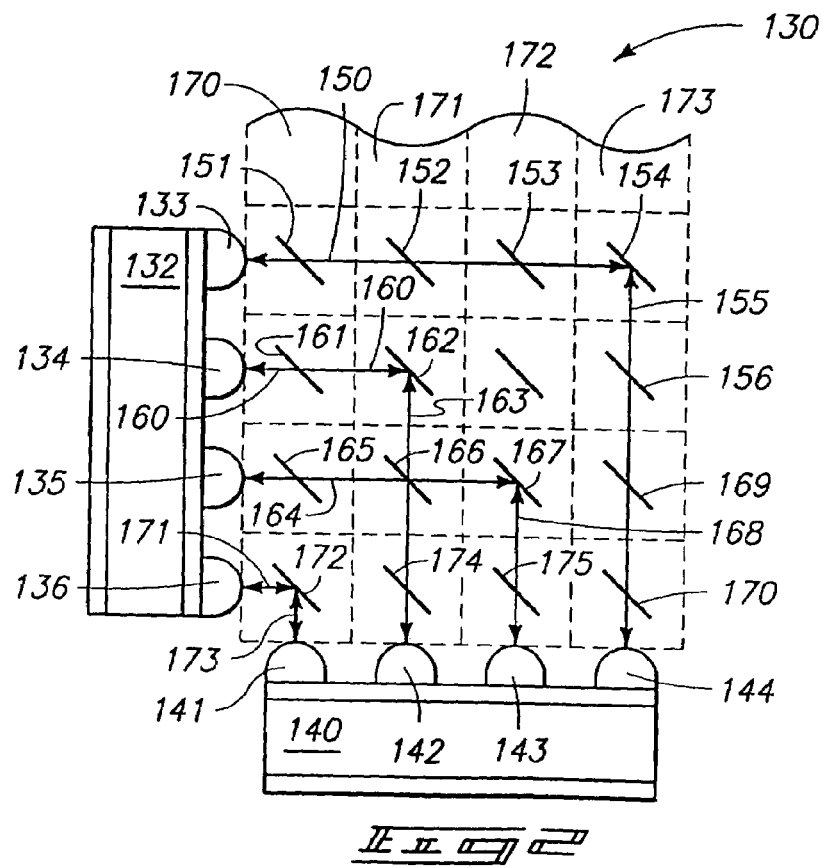

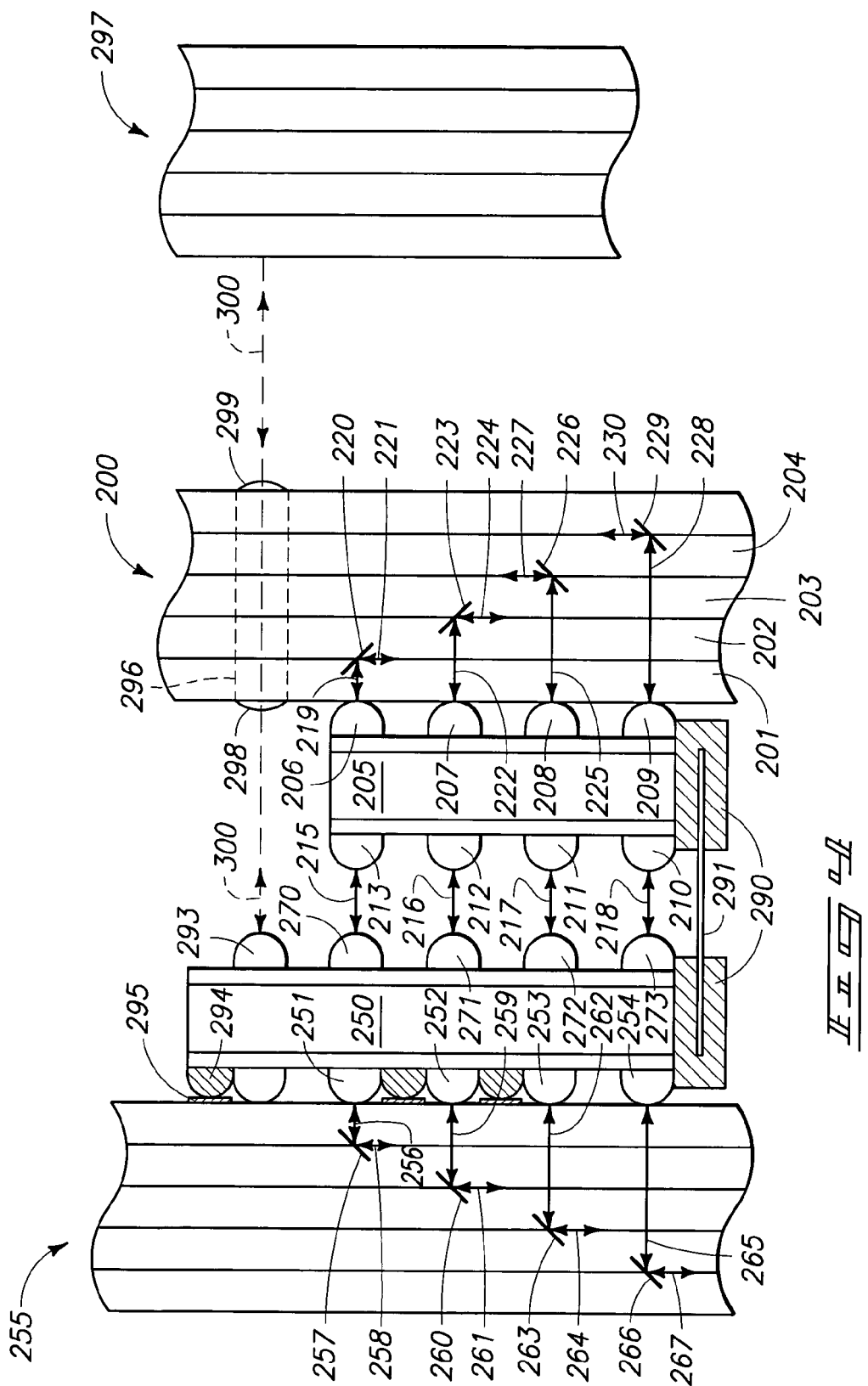

HIGHLY PARALLEL OPTICAL COMMUNICATION SYSTEM WITH INTRACARD AND INTERCARD COMMUNICATIONS

TECHNICAL FIELD

The invention pertains to a highly parallel optical communication system with intracard and intercard communications, more particularly, with an intracard bus system and/or an intercard free space transmission system.

BACKGROUND OF THE INVENTION

Data transfer and other communications systems will continue to require more bandwidth which will further challenge existing optical interconnect architectures. Current typical optical communications via serial or parallel optical links will not be able to sustain the higher data rates such as rates in the terabits per second ("Tb/s"). The prior art optical to electrical ("O/E") and electrical to optical ("E/O") conversions, when placed under the increasing bandwidth loads will dissipate a large amount of heat and make the effective thermal management much more difficult.

It is therefore an object of this invention to provide a new communications system which better facilitates high bandwidth data transfers.

SUMMARY OF THE INVENTION

The present invention provides an optical communication system which is highly parallel and includes an electro-optical chip integrated with an optical circuit board. The electro-optical chip has a first plurality of optical interface elements in an optical interface array configuration on a first side of the electro-optical chip, and the optical circuit board includes layered optical wave guides, optical coupling elements which are disposed relative to the electro-optical chip such that the coupling elements optically communicate with the first plurality of optical interface elements on the electro-optical chip. The coupling elements are further disposed to optically communicate with the plurality of optical wave guides.

Optical communication systems within the contemplation of this invention may also be combined with a second electro-optical chip also with a plurality of optical interface elements in an optical interface array type of configuration, an optical interface and integrated with or in, such as another electro-optical chip.

The invention also contemplates a method of communicating data to and through an optical circuit board which includes providing an electro-optical chip with a first plurality of optical interface elements in an optical interface array configuration on a first side of the electro-optical chip, then providing a first optical circuit board with a plurality of layered optical wave guides, and then transmitting a plurality of optical waves to or from the first plurality of optical interface elements on the first side of the electro-optical chip to or from a plurality of coupling elements disposed relative to the first plurality of optical interface elements on the electro-optical chip such that the plurality of coupling elements receive optical waves from the first plurality of optical interface elements on the electro-optical chip and redirect the optical waves through the plurality of optical wave guides.

In another aspect the invention includes intercard communications via free space transmission of optical signals to and from the electro-optical chip, preferably highly parallel transmission. In other or further aspects the invention may include a second optical circuit board disposed between the electro-optical chip and the first optical circuit board, the second optical circuit board including a plurality of optical signal passageways respectively disposed between the optical interface elements on the electro-optical chip and the plurality of coupling elements on the first optical circuit board and which allow passage of optical signals through the second optical circuit board. The passageways may be a solid structure which allow the optical signals to pass through or may be aligned apertures in the circuit board which allow the optical signals to pass through to the desired location on the first optical circuit board.

BRIEF DESCRIPTION OF THE DRAWINGS

Embodiments of the invention are described below with reference to the following accompanying drawings depicting examples embodying the best mode for practicing the invention.

FIG. 1 is a schematic view of one embodiment of this invention, illustrating an exemplary electro-optical chip and an exemplary optical circuit board with multiple layers of wave guides;

FIG. 3 is another embodiment of this invention, illustrating an optical circuit board, an electro-optical chip with ball grade array configurations on both sides and making free space transmission of optical waves with an optical element; and FIG. 4 is another embodiment contemplated by this invention, showing two optical circuit boards, each with an electro-optical chip for free space transmission between the two optical circuit boards.

DETAILED DESCRIPTION OF THE INVENTION

Figure 2:
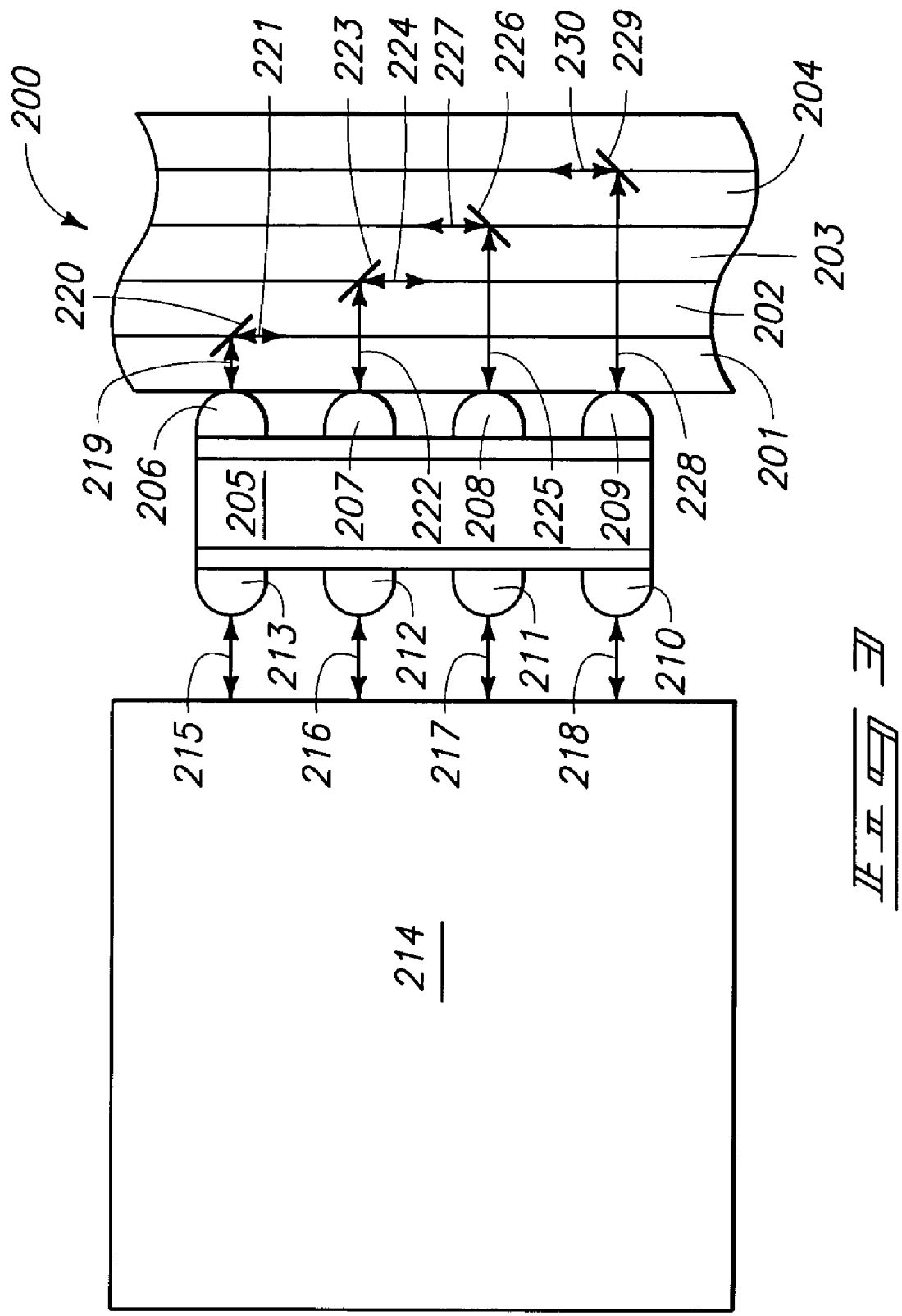
FIG. 2 is a schematic view of another embodiment of the invention showing an exemplary optical circuit board coupling optical signals between electro-optical chips and further acting as a switch.

Many of the manufacturing, fastening, connection, and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

There are various embodiments of communications systems contemplated by this invention. In one such embodiment, the invention includes highly parallel optical communications paths with multilayer optical printed circuit board ("OPCB") intracard communications combined with free space transmission for intercard communications. In this particular embodiment, silicon chips are integrated with electro-optical chips such as laser or detector arrays, and optics elements with an optical interface array (input/output) which is similar or analogous to an electrical ball grid array ("BGA") input/output ("I/O"). This embodiment provides a tightly coupled and highly parallel I/O to the optical interconnects and is described more fully below.

FIG. 1 illustrates one embodiment of a communications system 99 contemplated by this invention, showing optical circuit board 100 with a plurality of waveguides 120, 121, 122, 123 and 124. Electro-optical chip 102 is integrated with optical circuit board 100 in any one of a number of ways known in the trade, such as monolithically or by flip-chip bonding. The electro-optical communication components between electro-optical chip 102 and optical circuit board 100 are optical interface elements 103, 104, 105 and 106, which are configured in an optical interface array type of configuration on electro-optical chip 102 and between electro-optical chip 102 and optical circuit board 100.

FIG. 1 further illustrates how an optical signal 107 (which also may be called an optical beam or optical input or optical output) may be transmitted between optical interface element 103 and optical element 108. In the case of optical element 108, it is shown coupling the optical signal 107 from the transverse direction and redirecting it down longitudinally along a wave guide as represented by optical signal 109 arrow. Likewise, optical interface element 104 is shown in communication with optical element 111 such that if an optical signal is emitted or transmitted from optical interface element 104 to optical element 111, it is reflected along the wave guide as represented by optical signal arrow 112. Similarly, optical signal 113 reflects an optical signal between optical interface element 105 and optical element 114, resulting in optical beam arrow 115 if optical interface element 105 is a transmitter or emitter of the optical signal. Still further, optical signal arrow 116 is shown in communication between optical interface element 106 and optical element 117, with optical signal arrow 118 showing that optical element 117 has coupled or redirected the optical signal.

It will be appreciated by those of ordinary skill in the art that while the optical interface elements are schematically depicted in a ball or spherical shape, the optical interface units may be any one of a number of different shapes and/or kinds, with no one in particular being required to practice the invention.

The optical elements 108, 111, 114 and/or 117 may be any one of a number of different types of optical elements within the contemplation of this invention, such as a micro mirror controlled by a micro machine, a relatively reflective surface or a diffractive element. A reflective element such as a micro mirror is illustrated in FIG. 1 by optical elements 108, 111 and 117; while a diffractive element is illustrated in FIG. 1 by optical element 114. In some embodiments contemplated by this invention, the optical element may further act as a switch which may allow optical signals to pass through the switch or to be redirected by the switch in a predetermined way. In such an embodiment, the micro machine controlled reflective surfaces, micro mirrors or diffractive elements may be practiced in any one of a number of ways, one exemplary way being that disclosed in U.S. Pat. No. 6,215,222 for an "Optical Cross-Connect Switch Using Electrostatic Surface Actuators", which is incorporated herein by reference.

Similarly, it will be appreciated by those of ordinary skill in the art that the electro-optical chip 102 may be integrated with optical circuit board 100 in any one of a number of different ways, such as monolithically or by flip-chip bonding, both of which are known in the art.

It will also be appreciated by those of ordinary skill in the art that any one of a number of different types of kinds of optical circuit boards, integrated optical circuit boards or multi-layer optical boards with waveguides may be utilized within the contemplation of this invention and within the contemplation of the term "circuit board" as used herein, with any particularly appropriate reflective/transmittance properties of certain regions being optional embodiments. Certain semiconductor devices may include lasers, bi-stable optical devices, optical modulators, and photo detectors.

The optical circuit board with wave guides need not, but may relate to interconnection communications networks which utilize substantially plain or optical wave guides to guide laser light communications in two or three dimensions, not merely in one dimension. An optical wave guide in a wafer may also be utilized and is known in the art.

The electro-optical chip 102 shown is exemplary and may be semiconductor lasers such as a Vertical Cavity Surface Emitting Laser (VCSEL), and/or high speed detectors, which may possibly be with integrated optics to facilitate the optical coupling.

The optical ball grid or other array configuration, or optical interface array, will allow highly parallel optical data paths which are coupled into the optical printed circuit board. It will be appreciated by those of ordinary skill in the art that this invention contemplates an optical bus interconnect system for intracard optical communications.

FIG. 2 is a schematic of an embodiment of this invention which may include switches wherein the optical elements may either redirect or reflect optical signals or may allow them to be transmitted through the optical elements. FIG. 2 shows a section of an optical circuit board 130 with first electro-optical chip 132 integrated therewith. Optical circuit board 130 includes wave guides 170, 171, 172 and 173. In the embodiment shown, optical interface element 133 of first electro-optical chip 132 may transmit/emit or receive optical signal 150. Optical elements 151, 152 and 153 allow optical beam 150 to pass through, and optical element 154 is providing a reflective or diffractive element to redirect optical beam 150 or optical beam 155.

FIG. 2 illustrates a representative second electro-optical chip 140 which may be the same as the first electro-optical chip 132, showing representative optical interface elements 141, 142, 143 and 144, for transmitting/emitting and/or receiving optical signals.

The communication system illustrated in FIG. 2 couples optical signals between first electro-optical chip 132 and second electro-optical chip 140. Optical signal 155 is shown passing through optical elements 156, 169 and 170, being in optical communication with optical interface element 144 of second optical chip 140.

FIG. 2 shows optical interface element 134 emitting or receiving optical signal 160 through optical element 161 as reflected by optical element 162. Optical signal 163 is the optical signal between optical interface element 142 and optical element 162, passing through optical elements 166 and 174 which are set to allow transmission of optical signal 163 therethrough.

Optical interface element 135 either emits or receives optical signal 164 which is allowed to pass through or transmit through optical elements 165 and 166. Optical element 167 is set as a reflected element or a diffractive element to redirect or couple optical beams between optical interface element 135 and optical interface element 143. Optical beam 168 is either emitted or received by optical optical interface element 143 and is transmitted through optical element 175.

FIG. 2 further shows optical beam 171 between optical interface element 136 and optical element 172, and optical signal 173 between optical element 172 and optical interface element 141. Optical element 172 is shown reflecting or redirecting the optical beam between optical interface element 136 and optical interface element 141.

It will be further appreciated by those of ordinary skill in the art that the optical elements shown herein may be configured initially either as reflecting or transmitting elements, and may be switched depending on the application.

FIG. 3 shows the intra-board optical communications system from FIG. 1, with the addition of a free space transmission optical communication system with optical element 214. The optical element 214 may be any one of a number of different types or kinds of optical elements. It will also be appreciated by those of ordinary skill in the art that the optical signals transmitted may be in either direction as reflected by the optical signal arrows in FIG. 3.

FIG. 3 shows optical circuit board 200 with wave guides 201, 202, 203 and 204. Electro-optical chip 205 is shown integrated with optical circuit board 200 as described more fully above with respect to FIG. 1.

FIG. 3 further illustrates, in similar fashion to that described above, optical interface elements 206, 207, 208 and 209 which may be configured in an optical interface array configuration for highly parallel optical signal communication with optical circuit board 200. Optical signals 219, 222, 225 and 228 are either emitted or transmitted from optical interface elements 206, 207, 208 and 209, respectively. Optical elements 220, 223, 226 and 229 are shown in the optical circuit board 200 reflecting optical signals 219, 221, 222, 224, 227, 225, 228 and 230, as shown.

Electro-optical chip 205 has a similar or dissimilar optical interface array array configuration on a second side away from optical circuit board 200, showing optical interface elements 210, 211, 212 and 213 either emitting/transmitting or receiving optical signals 218, 217, 216 and 215, respectively. The configuration illustrated in the embodiment in FIG. 3 also shows free space transmission for inter-card transmission and an optical bus optical interface array type bus system for intra-card communication with optical circuit board 200. Electro-optical chip 205 may preferably be a silicon chip, but may also be any one of a number of different materials within the contemplation of this invention, including a gallium arsenide, III-V compounds (which are known in the art) or other types or kinds of semiconductor chips.

FIG. 4 is a schematic illustrating a first optical circuit board 200 and a first electro-optical chip 205 which are the same as shown in FIG. 3 with all like items being numbered in like fashion and will not be repeated here. Free space transmission between first electro-optical chip 205 and second electro-optical chip 250 is via optical signals 215, 216, 217 and 218, to optical interface elements 270, 271, 272 and 273, respectively, on second electro-optical chip 250. Optical interface elements 251, 252, 253 and 254 on second electro-optical chip 250 are the means through which optical signals 256, 259, 262 and 265 are respectively emitted/transmitted and/or received from optical elements 257, 260, 263 and 266, respectively. Optical elements 257, 260, 263 and 266 are shown as reflective or diffractive elements in FIG. 4 and redirect signals resulting in optical signals 258, 261, 264 and 267 traveling down wave guides in second optical circuit board 255. This occurs in similar fashion to that described above with regard to other optical circuit board wave guides.

The first and/or second electro-optical chips 205 and 250 respectively, may be integrated chips or multi-chip modules within the contemplation of the invention and depending on the application. The electro-optical chips will generally perform any one or more of numerous potential functions, such as electrical to optical conversion, switching and/or routing of data, wavelength conversion, data rate conversion (such as high to low), amplification, and/or other functions.

The embodiment of the invention illustrated in FIG. 4 further illustrates additional features contemplated by this invention, such as optical interface element 293 on second electro-optical chip 250 emitting and/or receiving optical signals 300 through first optical circuit board 200 to and/or from third optical circuit board 297. Third optical circuit board 297 may be configured in any one of a number of ways, including similar to first optical circuit board 200 or second optical circuit board 255. Optical signal passageway 296 may be a hole or aperture in first optical circuit board 200, or a vertical waveguide index matching configuration, which is known in the art. Lens 298 and 299, or other optical elements may be utilized on one or both ends of optical signal passageway 296 to focus or re-focus the optical signals 300.

FIG. 4 further illustrates alignment members 290 with alignment guide pin 291 which is one of the numerous ways which may be utilized to align the first optical circuit board 200 and the second optical circuit board 255. FIG. 4 further illustrates solder pad 295 on second optical circuit board 255, interacting with solder balls 294 on electro-optical chip 250, which would become self aligned after assembly and re-flow.

Alignment between electro-optical chips 250 and 205 may also be accomplished in other ways known in the trade, such as by the active alignment method. An example of an active alignment method in the embodiment shown would generally involve the receipt of optical signal data for optical signals transmitted from first electro-optical chip 205 to second electro-optical chip 250, and the optical signal will then be utilized to search for the best alignment between the electro-optical chips during the attachment of the electro-optical chips.

The micromachine controlled reflective surfaces or micromirrors may be practiced in any one of a number of ways within the contemplation of this invention, one exemplary way being that disclosed in U.S. Pat. No. 6,215,222, for an "Optical cross-connect switch using electrostatic surface actuators", which is incorporated herein by this reference.

As will be appreciated by those of reasonable skill in the art, there are numerous embodiments to this invention, and variations of elements and components which may be used, all within the scope of this invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An optical communications system, comprising:
   at least one electro-optical chip;
   a circuit board;
   a plurality of optical interface elements between the at least one electro-optical chip and the circuit board for directing light in a first direction;
   a plurality of optical waveguides arranged in layers on the circuit board for directing light in second directions different from the first direction; and
   a plurality of optical coupling elements between the plurality of optical interface elements and the plurality of optical waveguides, each of the plurality optical coupling elements redirecting light between one of the plurality of optical interface elements and one of the plurality of optical waveguides.

2. The optical communications system according to claim 1, wherein the second directions are transverse to the first direction.

3. The optical communications system according to claim 1, wherein at least one of the plurality of optical coupling elements redirects light from one of the plurality of optical interface elements to one of the plurality of optical waveguides.

4. The optical communications system according to claim 1, wherein at least one of the plurality of optical coupling elements redirects light from one of the plurality of optical waveguides to one of the plurality of optical interface elements.

5. The optical communications system according to claim 1, wherein at least one of the plurality of optical coupling elements comprises a reflecting element.

6. The optical communications system according to claim 5, wherein the reflecting element comprises a micro mirror.

7. The optical communications system according to claim 1, wherein at least one of the plurality of optical coupling elements comprises a diffractive element.

8. The optical communications system according to claim 1, wherein the at least one electro-optical chip is assembled to the circuit board.

9. The optical communications system according to claim 1, wherein the at least one electro-optical chip includes at least one semiconductor laser.

10. The optical communications system according to claim 1, wherein the at least one electro-optical chip includes at least one vertical cavity surface emitting laser.

11. The optical communications system according to claim 1, wherein the at least one electro-optical chip includes at least one high speed photodetector.

12. The optical communications system according to claim 1, wherein the plurality of optical interface elements comprises a first plurality of optical interface elements on a first side of the at least one electro-optical chip, and wherein the system further includes a second plurality of optical interface elements on a second side of the at least one electro-optical chip for providing optical communication between the at least one electro-optical chip and an optical element.

13. The optical communications system according to claim 12, wherein the second plurality of optical interface elements provide optical communication between the at least one electro-optical chip and the optical element across a free space.

14. The optical communications system according to claim 13, wherein the at least one electro-optical chip comprises a first electro-optical chip, and wherein the optical element comprises a second electro-optical chip.

15. The optical communications system according to claim 14, wherein the circuit board comprises a first circuit board, and wherein the system further includes a second circuit board having a second plurality of optical waveguides in optical communication with the second electro-optical chip.

16. A method for communicating data comprising:
providing at least one electro-optical chip having a plurality of optical interface elements for directing light in a first direction;
providing a circuit board having a plurality of optical waveguides arranged in layers for directing light in second directions different from the first direction; and
providing a plurality of optical coupling elements between the plurality of optical interface elements and the plurality of optical waveguides, each of the plurality optical coupling elements redirecting light between one of the plurality of optical interface elements and one of the plurality of optical waveguides.

17. The method according to claim 16, and further including assembling the at least one electro-optical chip to the circuit board.

18. The method according to claim 16, wherein providing a plurality of optical coupling elements between the plurality of optical interface elements and the plurality optical waveguides comprises providing a plurality of reflecting elements between the plurality of optical interface elements and the plurality optical waveguides, each of the plurality of reflecting elements reflecting light between one of the plurality of optical interface elements and one of the plurality of optical waveguides.

19. The method according to claim 16, wherein the at least one electro-optical chip comprises a first electro-optical chip having a first plurality of optical interface elements, and wherein the method further includes providing optical communication between the first electro-optical chip and a second electro-optical chip through a second plurality of optical interface elements.

20. The method according to claim 19, wherein providing optical communication between the first electro-optical chip and the second electro-optical chip comprises providing optical communication between the first electro-optical chip and the second electro-optical chip across an open space.

* * * * *